US006947475B2

(12) United States Patent
Sendonaris et al.

(10) Patent No.: US 6,947,475 B2
(45) Date of Patent: Sep. 20, 2005

(54) METHOD AND APPARATUS FOR ESTIMATING CHANNEL CHARACTERISTICS USING PILOT AND NON-PILOT DATA

(75) Inventors: Andrew Sendonaris, San Jose, CA (US); Rajesh Sundaresan, Santa Clara, CA (US)

(73) Assignee: Qualcomm Inc., San Diego, CA (US)

( * ) Notice: Subject to any disclaimer, the term of this patent is extended or adjusted under 35 U.S.C. 154(b) by 909 days.

(21) Appl. No.: 09/826,130

(22) Filed: Apr. 4, 2001

(65) Prior Publication Data

US 2002/0167923 A1 Nov. 14, 2002

Related U.S. Application Data

(60) Provisional application No. 60/264,621, filed on Jan. 26, 2001.

(51) Int. Cl.[7] .............................. H04B 1/69; H04L 7/06; H04L 13/10
(52) U.S. Cl. ...................... 375/148; 375/365; 375/130; 370/206
(58) Field of Search ................................ 375/140, 148, 375/130, 365; 370/335, 342, 206; 342/387, 457; 455/456.1, 456.3

(56) References Cited

U.S. PATENT DOCUMENTS

| | | | | |
|---|---|---|---|---|
| 5,465,276 A | * | 11/1995 | Larsson et al. | 375/346 |
| 5,623,511 A | * | 4/1997 | Bar-David et al. | 375/143 |
| 5,809,020 A | * | 9/1998 | Bruckert et al. | 370/335 |
| 5,812,542 A | * | 9/1998 | Bruckert et al. | 370/335 |
| 6,219,391 B1 | * | 4/2001 | Nakano | 375/346 |
| 6,278,726 B1 | * | 8/2001 | Mesecher et al. | 375/148 |
| 6,304,624 B1 | * | 10/2001 | Seki et al. | 375/365 |
| 6,483,821 B1 | * | 11/2002 | Dabak et al. | 370/329 |
| 6,507,602 B1 | * | 1/2003 | Dent | 375/142 |
| 6,658,050 B1 | * | 12/2003 | Ramesh et al. | 375/219 |
| 6,674,815 B2 | * | 1/2004 | Zangi | 375/340 |
| 6,690,713 B1 | * | 2/2004 | Kim et al. | 375/147 |
| 6,700,919 B1 | * | 3/2004 | Papasakellariou | 375/130 |

FOREIGN PATENT DOCUMENTS

| | | |
|---|---|---|
| EP | 1107524 | 6/2001 |
| WO | 9611534 | 4/1996 |

OTHER PUBLICATIONS

Yue et al, Performance Comparisons of Channel Estimation Techniques in Multipath Fading CDMA, May 2004, Wireless Communications, IEEE Transactions on, vol.: 3, Issue 3, pp. : 716–724.*

(Continued)

*Primary Examiner*—Amanda T. Le
*Assistant Examiner*—Lawrence Williams
(74) *Attorney, Agent, or Firm*—Philip R. Wadsworth; Charles D Brown; George Pappas

(57) ABSTRACT

Techniques for incorporating non-pilot symbols along with pilot symbols to improve the estimate of the characteristics (e.g., amplitude and phase) of a communication link. A pilot filter weighs samples corresponding to pilot and non-pilot symbol by different sets of coefficients, which have values determined by and/or corresponding to the confidence in the detected sample. Samples corresponding to pilot symbols are typically associated with higher degree of confidence and are weighted more (e.g., with weights of 1.0). Samples corresponding to non-pilot symbols are typically associated with lower confidence and are weighted with values that may be variable and dependent on the degree of confidence in the samples (e.g., with weights ranging from 0.0 up to 1.0). The weights are updated based on a particular estimator such as a MAP (Maximum a Posteriori) estimator, a MLE (Maximum Likelihood Estimator), or some other estimator.

22 Claims, 8 Drawing Sheets

OTHER PUBLICATIONS

Guenach et al, Downlink Performance Analysis of a BPSK–Based WCDMA Using Conventional Rake Receivers with Channel Estimatoin, Nov. 2001, Selected Areas in Communications, IEEE Journal on, vol.: 19, Issue: 11, pp. : 2165–2176.*

Weber, Efficient Pilot–Assisted Channel Estimation for Random Access in IMT–2000/UMTS, Sep. 18–21, 2000, The 11th IEEE International Symposium on, vol.: 2, pp. 1459–1463.*

Povey, et al., *A Decision–Directed Spread–Spectrum RAKE Receiver for Fast–Fading Mobile Channels*: IEEE Transactions on Vehicular Technology, vol. 45, No. 3(1996).

J. Choi, et al., *Multipath CDMA channel estimation by jointly utilizing pilot and traffic channels*: IEE Proc. Commun. vol. 146, No. 5 (1999).

* cited by examiner

METHOD AND APPARATUS FOR ESTIMATING CHANNEL CHARACTERISTICS USING PILOT AND NON-PILOT DATA

CROSS REFERENCE TO RELATED APPLICATIONS

This application claims the benefit of U.S. Provisional Patent Application No. 60/264,621, filed Jan. 26, 2001, and entitled "Pilot Filter Incorporating Non-Pilot Symbols."

BACKGROUND

1. Field

The present invention relates generally to data communication, and more specifically to techniques for estimating the characteristics (e.g., amplitude and phase) of a communication link using pilot and non-pilot data.

2. Background

Wireless communication systems are widely deployed to provide various types of communication such as voice, packet data, and so on. These systems may be based on code division multiple access (CDMA), time division multiple access (TDMA), or some other modulation techniques. CDMA systems may provide certain advantages over other types of system, including increased system capacity.

For many wireless communication systems, a pilot is transmitted along with signaling and traffic data (e.g., voice and/or packet data) from a transmitter unit to a receiver unit. The pilot is typically a known data pattern that is processed and modulated in a known manner. Signaling and traffic data are also processed and modulated via respective schemes, combined with the processed pilot, and transmitted to the receiver unit. The transmitted pilot allows the receiver unit to estimate the communication link used to transmit signaling and traffic data.

At the receiver unit, a rake receiver is often used to recover the transmitted pilot, signaling, and traffic data. The transmitted signal may be received via multiple signal paths (or multipaths), and each received multipath may be processed by a respective finger processor of the rake receiver. Each finger processor processes the pilot in a complementary manner to derive a pilot reference having amplitude and phase determined by the characteristics of that multipath. The pilot reference is typically used to coherently demodulate the signaling and traffic data, which are transmitted along with the pilot and are similarly distorted by the propagation path. The pilot references for the received multipaths are also used to combine the demodulated multipaths to derive an improved estimate of the transmitted signaling and traffic data.

The quality of the pilot reference directly impacts the performance of the demodulation process, which in turn determines the performance of the communication system. A higher quality pilot reference may be obtained by transmitting the pilot from the transmitter unit at higher transmit power level. However, since the amount of available transmit power is limited, transmitting the pilot at a higher power level consumes more resources and decreases the amount of power available for signaling and traffic data.

There is therefore a need in the art for techniques capable of providing a higher quality pilot reference based on the transmitted pilot, signaling, and (possibly) traffic data.

SUMMARY

Aspects of the invention provide techniques for incorporating non-pilot symbols along with pilot symbols to improve the estimate of the characteristics (e.g., amplitude and phase) of a communication link. A pilot filter described herein weighs samples corresponding to pilot and non-pilot symbol by different sets of coefficients, which have values determined by and/or corresponding to the confidence in the detected sample. Samples corresponding to pilot symbols are typically associated with higher degree of confidence and are weighted more (e.g., with weights of 1.0). Samples corresponding to non-pilot symbols are typically associated with lower confidence and are weighted with values that may be variable and dependent on the degree of confidence in the samples (e.g., with weights ranging from 0.0 up to 1.0). The weights may be updated based on a particular estimator such as a MAP (Maximum a Posteriori) estimator, a MLE (Maximum Likelihood Estimator), or some other estimator.

An embodiment of the invention provides a method for generating pilot estimates indicative of the characteristics (e.g., amplitude and phase) of a communication link. In accordance with the method, samples corresponding to pilot symbols and non-pilot symbols are initially received. Samples corresponding to pilot symbols are weighted in accordance with a first set of one or more coefficients to provide first weighted samples, and samples corresponding to non-pilot symbols are weighted in accordance with a second set of one or more coefficients to provide second weighted samples. The pilot estimates are then generated based on the first and second weighted samples.

The coefficients for pilot symbols can have equal magnitude (e.g., 1.0), and the coefficients for non-pilot symbols can have magnitude equal to or less than that of the pilot symbol coefficients. The coefficients for non-pilot symbol can be updated in accordance with a particular function and further based on (1) the received samples corresponding to non-pilot symbols, (2) the pilot estimates, and (3) a term indicative of the quality of the received samples used to update the coefficients. In this manner, the coefficients for non-pilot symbols can be updated to larger values if the quality of the samples is high, and to lower values if the quality of the samples is low.

Various approximations may be made to simplify the computations for updating the coefficients and weighting the received samples. For example, the coefficients may be quantized to 5 bits or less, the function used to update the coefficients may be approximated with a piece-wise linear function, one or more terms in the function may be approximated with constants, and so on.

The techniques described herein may be used for any communication system in which pilot and non-pilot symbols are transmitted (e.g., in a time-division multiplexed manner) and may be advantageously used in various CDMA systems (e.g., a cdma2000 system, a W-CDMA system, and others).

The invention further provides other methods, apparatus, and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
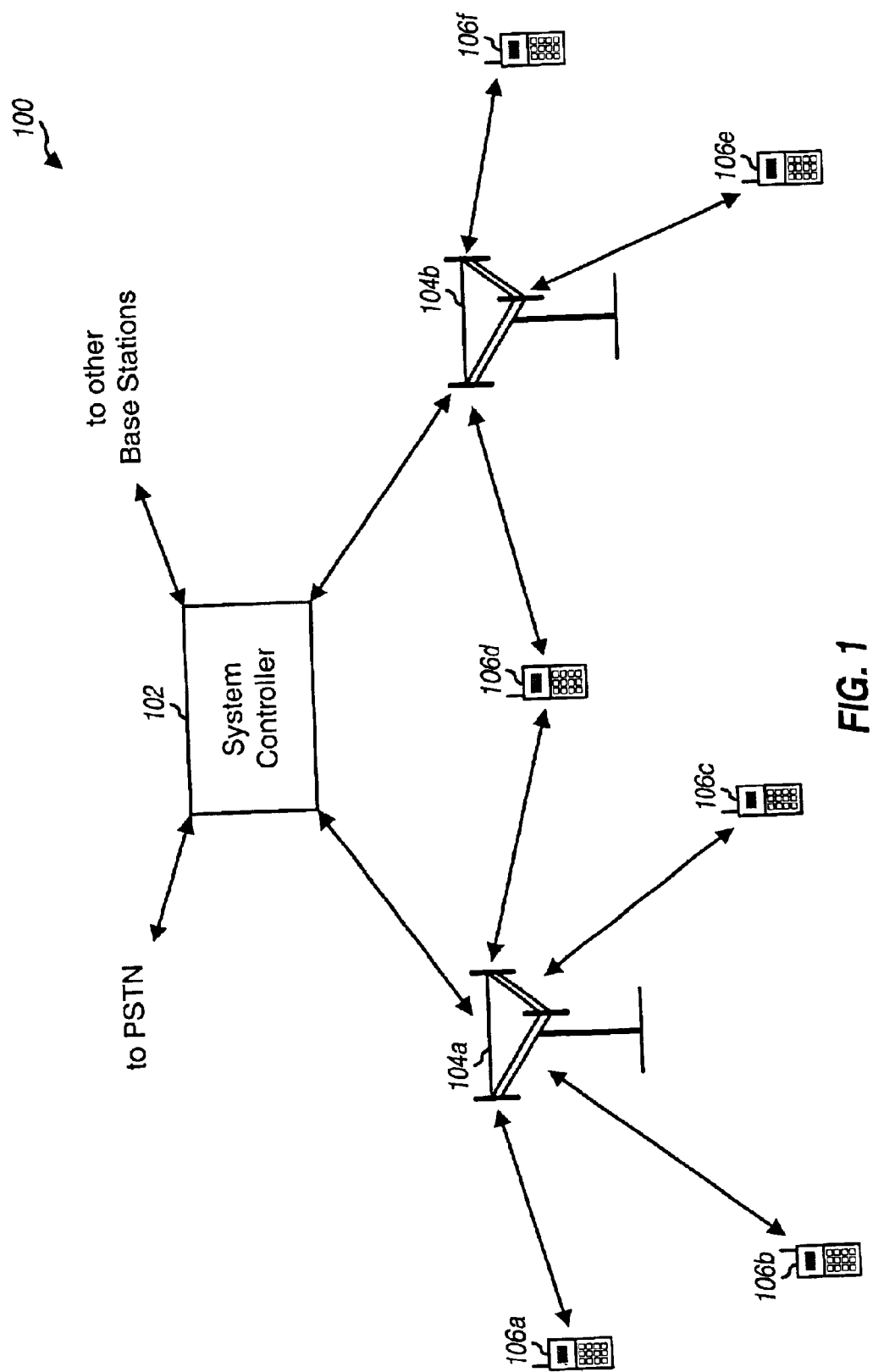
FIG. 1 is a diagram of a wireless communication system that supports a number of users and capable of implementing various aspects of the invention.

FIG. 1 is a diagram of a wireless communication system 100 that supports a number of users and capable of implementing various aspects of the invention. System 100 provides communication for a number of cells, with each cell being serviced by a corresponding base station 104. The base stations are also commonly referred to as base transceiver systems (BTS). Various remote terminals 106 are dispersed throughout the system. Each remote terminal 106 may communicate with one or more base stations 104 on the downlink and uplink at any particular moment, depending on whether or not the remote terminal is active and whether or not it is in soft handoff. The downlink (i.e., forward link) refers to transmission from base station 104 to remote terminal 106, and the uplink (i.e., reverse link) refers to transmission from remote terminal 106 to base station 104. As shown in FIG. 1, base station 104a communicates with remote terminals 106a, 106b, 106c, and 106d, and base station 104b communicates with remote terminals 106d, 106e, and 106f. Remote terminal 106d is in soft handoff and concurrently communicates with base stations 104a and 104b.

In system 100, a base station controller (BSC) 102 couples to base stations 104 and may further couple to a public switched telephone network (PSTN) via a mobile switching center (MSC), which is not shown in FIG. 1 for simplicity. The BSC may also couple into a packet network via a packet data serving node (PDSN), which is also not shown in FIG. 1. BSC 102 provides coordination and control for the base stations coupled to it. BSC 102 further controls the routing of telephone calls among remote terminals 106, and between remote terminals 106 and users coupled to the PSTN (e.g., conventional telephones) and to the packet network, via base stations 104.

The system 100 can be designed to support one or more CDMA standards such as the IS-95, IS-98, cdma2000, W-CDMA, some other CDMA standard, or a combination thereof. These CDMA standards are known in the art and incorporated herein by reference.

Various aspects and embodiments of the invention can be applied to both the uplink and downlink in a wireless communication system. For clarity, various aspects and embodiments of the invention are now specifically described for the uplink in a W-CDMA system.

Figure 2:
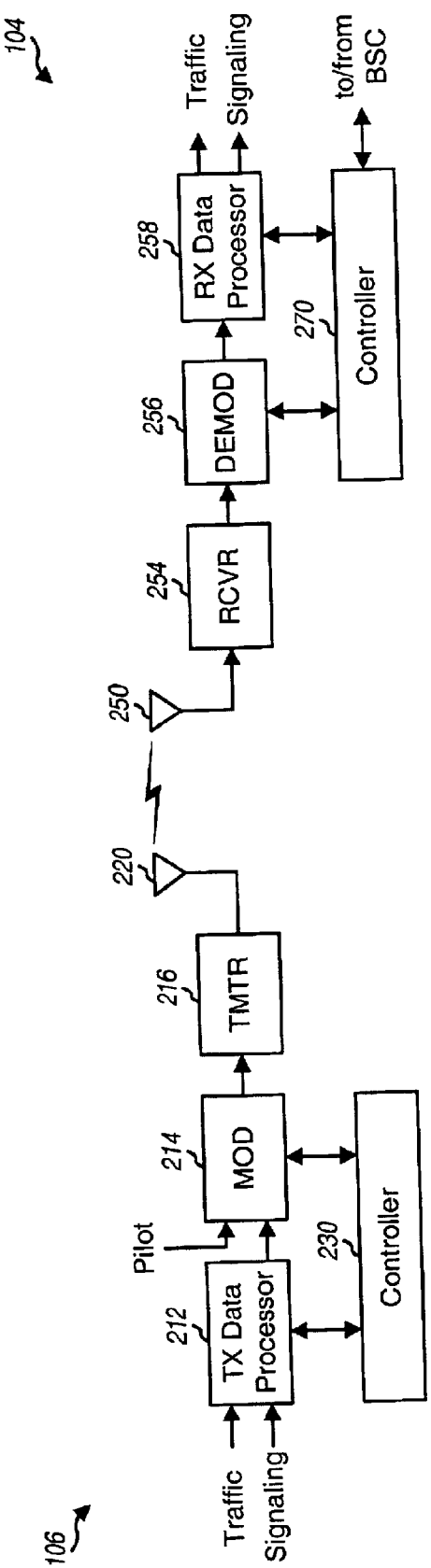
FIG. 2 is a simplified block diagram of the processing for an uplink transmission from a remote terminal to a base station.

FIG. 2 is a simplified block diagram of the processing for an uplink transmission from remote terminal 106 to base station 104. At remote terminal 106, voice and/or packet data (i.e., traffic data) and control data (i.e., signaling) are provided to a transmit (TX) data processor 212, which formats and encodes the data with one or more coding schemes to generate coded data. Each coding scheme may include any combination of cyclic redundancy check (CRC), convolutional, Turbo, block, and other coding, or no coding at all. Voice, packet, and control data are typically coded using different schemes, and different types of control data may also be coded differently.

The coded data is then provided to a modulator (MOD) 214 and further processed (e.g., covered, spread with short PN sequences, and scrambled with a long PN sequence assigned to the user terminal) to generate modulated data. Pilot data is also typically processed in accordance with another scheme to provide modulated pilot. The modulated data and pilot are combined and provided to a transmitter unit (TMTR) 216 and conditioned (e.g., converted to one or more analog signals, amplified, filtered, and quadrature modulated) to generate an uplink signal that is transmitted via an antenna 220 to base station 104.

At base station 104, the uplink signal is received by an antenna 250 and provided to a receiver unit (RCVR) 254. Receiver unit 254 conditions (e.g., filters, amplifies, downconverts, and digitizes) the received signal and provides samples. A demodulator (DEMOD) 256 receives and processes (e.g., despreads, decovers, and pilot demodulates) the samples to provide recovered symbols. Demodulator 256 may implement a rake receiver that processes multiple instances of the received signal and generates combined symbols. A receive (RX) data processor 258 then decodes the symbols to recover the traffic data and signaling that were transmitted on the uplink. The processing by demodulator 256 and RX data processor 258 are complementary to that performed at remote terminal 106. Demodulator 256 is described in further detail below.

For some wireless systems, a pilot is transmitted along with signaling and traffic data from the base station to the remote terminals, and vice versa. The transmitted pilot is used by the receiving unit to coherently demodulate signaling and traffic data transmitted along with the pilot.

Figure 3:
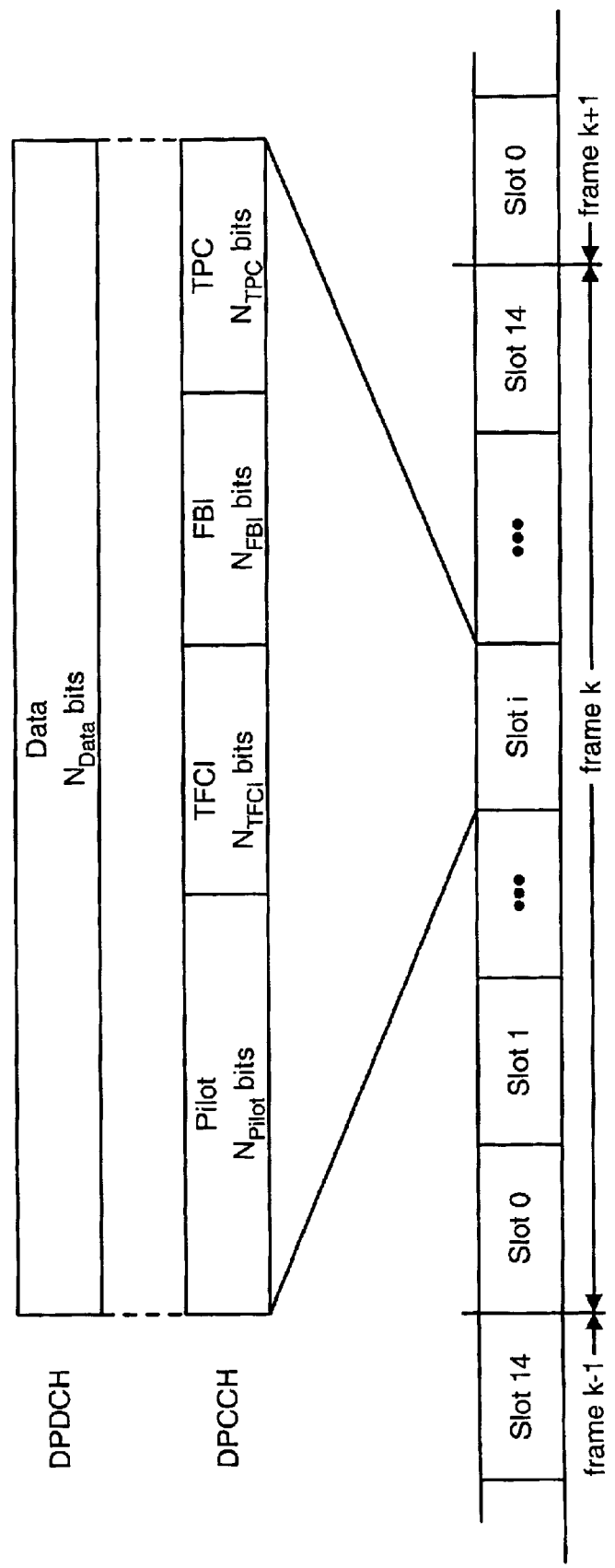
FIG. 3 is a diagram of a frame format and a slot format for an uplink dedicated physical channel as defined by the W-CDMA standard.

FIG. 3 is a diagram of a frame format and a slot format for an uplink dedicated physical channel as defined by the W-CDMA standard. Generally, different frame formats are defined by the W-CDMA standard for the uplink and downlink, and a different frame format is further defined for each type of physical channel such as the dedicated physical channel (DPCH). The traffic data to be transmitted on each physical channel is partitioned into radio frames, with each radio frame including 15 slots labeled as slot 0 through slot 14. Each slot is further partitioned into one or more fields that are used to carry traffic, control, and pilot data.

As shown in FIG. 3, the uplink dedicated physical channel includes a dedicated physical data channel (DPDCH) and a dedicated physical control channel (DPCCH), which are respectively transmitted on the inphase (I) and quadrature (Q) components of a modulated uplink signal. The DPDCH carries user-dedicated packet data, and the DPCCH carries control data (including pilot data). Each slot of the DPCCH includes a transmit power control (TPC) field, a feedback information (FBI) field, an optional transport format combination indicator (TFCI) field, and a pilot field. The TPC field is used to send power control information to direct the base station to adjusts its transmit power on the downlink channels either up or down to achieve the desired performance while minimizing interference. The TFCI field is used to send instantaneous parameters (e.g., the bit rate, channelization code, and so on) of the transport channels multiplexed on the uplink DPDCH. The FBI field is used to support techniques requiring feedback between the user terminal and base station, such as various transmit diversity modes. The pilot field is used to send pilot data for the dedicated physical channel.

Because of limited system resources, a tradeoff is made between using the channel to send pilot data and traffic and control data. Many newer generation CDMA systems transmit the pilot in a time division multiplexed (TDM) manner along with other control data on a physical channel. In fact, the pilot symbols may comprise only a portion (e.g., 20% to 50%) of the non-traffic symbols transmitted on the physical channel. The pilot symbols are associated with a known data pattern and can be used to estimate the characteristics of the communication link. The other control symbols are typically not known a priori by the base station.

In one simple design, only the pilot symbols are processed by a pilot filter to recover a pilot reference, which is then used to coherently demodulate the traffic data. In this design, other control symbols are simply ignored, and the pilot filter is maintained (i.e., not updated) during non-pilot symbol periods. However, when a large percentage (e.g., 50%) of the non-traffic symbols are not pilot symbols, the performance of the pilot filter (i.e., the channel estimates) may degrade noticeably, since there may be a gap (of up to five non-pilot symbols) between successive pilot symbols.

In accordance with an aspect of the invention, non-pilot symbols are also used to improve the performance of the pilot filter. An estimator is employed to use as much available information as possible to estimate the desired channel qualities, which for data demodulation are the gain and phase of the channel used for the data transmission.

The received signal may be processed and digitized to provide (complex-value) samples. The samples corresponding to each received multipath may be processed by an assigned finger processor of a rake receiver, as described in further detail below. If there are $N_T$ ontime samples (i.e., properly aligned in time), of which $N_P$ samples correspond to pilot symbols and the remaining samples correspond to non-pilot symbols, then the samples may be expressed as:

$$y_i = \begin{cases} A \cdot e^{j\varphi} + n_i & i = 1, \ldots, N_P \\ A \cdot e^{j\varphi} \cdot b_i + n_i & i = N_P + 1, \ldots, N_T \end{cases} \quad \text{Eq (1)}$$

Where $n_i$ is the channel noise having the properties of $n_i \sim CN(0, \sigma^2)$ and independent and identically distributed (iid), $b_i$ is the value of the non-pilot symbol (i.e., $b_i \in \{-1, 1\}$) and iid, and $A$ and $\varphi$ are the channel amplitude and phase, respectively. The phase $\varphi$ is typically used to remove the phase ambiguity from the data in a finger processor of a rake receiver (described below), and the amplitude $A$ is used to properly combine the results across multiple assigned finger processors. The quantities $A$ and $\varphi$ may be estimated using a MAP (Maximum a Posteriori) estimator, an MLE (Maximum Likelihood Estimator), or some other estimator. The MAP estimator may provide a more optimal estimate of $A$ and $\varphi$ in comparison to those from other estimators.

The MAP estimator provides the solution to the following:

$$\max_{A,\varphi} p_{A,\varphi|\underline{y}}, \quad \text{Eq (2)}$$

Where $\underline{y}$ is a vector of $N_T$ samples (i.e., $\underline{y} = [y_1, y_2, \ldots, y_{N_T}]^T$) and $p_{A,\varphi|\underline{y}}$ is the joint probability distribution function (pdf) of $A$ and $\varphi$ given $\underline{y}$. Equation (2) may be manipulated as follows:

$$\max_{A,\varphi} p_{A,\varphi|\underline{y}} \equiv \max_{A,\varphi} p_{\underline{y}|A,\varphi} p_A p_\varphi / p_{\underline{y}} \quad \text{Eq (3)}$$

$$\equiv \max_{A,\varphi} p_{\underline{y}|A,\varphi} p_A$$

$$\equiv \max_{A,\varphi} p_A \prod_{i=1}^{N_T} p_{y_i|A,\varphi},$$

where $$\prod_{i=1}^{N_T} p_{y_i|A,\varphi} = \quad \text{Eq (4)}$$

$$e^{-\frac{N_T A^2}{2\sigma^2}} \exp\left(\text{Re}\left\{\frac{A e^{j\varphi}}{\sigma^2} \sum_{i=1}^{N_P} y_i^*\right\}\right) \prod_{i=N_P+1}^{N_T} \cosh\left(\text{Re}\left\{\frac{A e^{j\varphi}}{\sigma^2} y_i^*\right\}\right).$$

The first equality in equation (3) is due to Bayes' Theorem and the fact that $A$ and $\varphi$ are independent, the second equality is due to the fact that $\varphi$ is uniform and that $p_{\underline{y}}$ is not a function of $A$ or $\varphi$, and the third equality is due to the fact that, given $A$ and $\varphi$, the $y_i$ are independent. The natural logarithm of the argument in equation (3) may be taken to yield the following:

$$\max_{A,\varphi} \; g(A) + \text{Re}\left\{\frac{A e^{j\varphi}}{\sigma^2} \sum_{i=1}^{N_P} y_i^*\right\} + \sum_{i=N_P+1}^{N_T} \ln \cosh\left(\text{Re}\left\{\frac{A e^{j\varphi}}{\sigma^2} y_i^*\right\}\right) \quad \text{Eq (5)}$$

where $$g(A) = \quad \text{Eq (6)}$$

$$\begin{cases} -\dfrac{A^2}{2} \dfrac{N_T}{\sigma^2} & \text{MLE solution } (A \text{ is "Uniform"}) \\ -\dfrac{A^2}{2}\left(\dfrac{N_T}{\sigma^2} + \dfrac{1}{\sigma_A^2}\right) + \ln A & \text{MAP solution } (A \text{ is Rayleigh with second moment } 2\sigma_A^2) \end{cases}$$

To find the optimal estimates of $A$ and $\varphi$, the expression for equation (5) is solved. This can be achieved by first taking the derivative of equation (5) with respect to $\varphi$ and setting the derivative to zero, as follows:

$$\frac{\partial}{\partial \varphi} = \text{Im}\left\{e^{j\varphi}\left[\sum_{i=1}^{N_P} y_i^* + \sum_{i=N_P+1}^{N_T} y_i^* \tanh\left(\text{Re}\left\{\frac{A e^{j\varphi}}{\sigma^2} y_i^*\right\}\right)\right]\right\} = 0. \quad \text{Eq (7)}$$

Next, the derivative of equation (5) is taken with respect to $A$ and set to zero, as follows $$\frac{\partial}{\partial A} = \quad \text{Eq (8)}$$

$$\sigma^2 g'(A) + \text{Re}\left\{e^{j\varphi}\left[\sum_{i=1}^{N_P} y_i^* + \sum_{i=N_P+1}^{N_T} y_i^* \tanh\left(\text{Re}\left\{\frac{A e^{j\varphi}}{\sigma^2} y_i^*\right\}\right)\right]\right\} = 0,$$

where $$g'(A) = \begin{cases} -\dfrac{AN_T}{\sigma^2} & \text{MLE solution} \\ -A\left(\dfrac{N_T}{\sigma^2} + \dfrac{1}{\sigma_A^2}\right) + \dfrac{1}{A} & \text{MAP solution.} \end{cases} \quad \text{Eq (9)}$$

To simplify the notation, the following is defined:

$$f(A, \varphi) = \frac{1}{N_T}\left[\sum_{i=1}^{N_P} y_i + \sum_{i=N_P+1}^{N_T} y_i \tanh\left(\text{Re}\left\{\frac{Ae^{j\varphi}}{\sigma^2} y_i^*\right\}\right)\right]. \quad \text{Eq (10)}$$

The first-order conditions on A and φ can then be expressed as:

$$\text{Im}\{e^{j\varphi}f^*(A,\varphi)\}=0, \quad \text{Eq (11)}$$

and $$g'(A) + \frac{N_T}{\sigma^2}\text{Re}\{e^{j\varphi}f^*(A, \varphi)\} = 0. \quad \text{Eq (12)}$$

The expression for f(A,φ) in equation (10) represents a generalized pilot filter in which the samples $y_i$ are weighted differently depending on whether they correspond to pilot symbols or non-pilot symbols. For i=1, . . . $N_P$, the samples correspond to pilot symbols and are weighted by a value of 1.0. And for i=$N_P$+1, . . . , $N_T$, the samples correspond to non-pilot symbols and are weighted by tanh(Re{$y_i^* Ae^{j\Phi}$/σ²}).

Equation (10) represents a weighted decision feedback filter. When the signal-to-noise-plus-interface ratio (SNR) is high (i.e., σ² is a low value), there is greater likelihood of a non-pilot symbol being received correctly, and the symbol is weighted more (i.e., with weights approaching ±1.0). Conversely, when the SNR is low (i.e., σ² is a high value), there is lower likelihood of the non-pilot symbol being received correctly, and the symbol is weighted less (i.e., with weights approaching ±0.0). Thus, the pilot filter retains the sign of the symbol decision but weighs the magnitude of the symbol by a value that is related to the confidence in the detected symbol value.

Equations (11) and (12) may be solved in an iterative manner. From equation (11), the phase φ may be expressed as follows:

$$\varphi = \angle f(A,\varphi), \quad \text{Eq (13)}$$

where ∠ x denotes the phase of x. Equations (12) and (13) may be combined to provide the following:

$$g'(A) = -\frac{N_T}{\sigma^2}|f(A, \varphi)|. \quad \text{Eq (14)}$$

Equations (13) and (14) indicate that, given an initial estimate of A and φ, the successive estimates of A and φ may be derived as follows:

$$\hat{\varphi}_k = \angle f(\hat{A}_{k-1}, \hat{\varphi}_{k-1})$$

$$g'(\hat{A}_k) = -\frac{N_T}{\sigma^2}|f(\hat{A}_{k-1}, \hat{\varphi}_{k-1})|. \quad \text{Eq (15)}$$

The initial estimates of A and φ, which are respectively denoted as $\hat{A}_0$ and $\hat{\varphi}_0$, may be derived using only the $N_P$ pilot symbols or as the current pilot filter output. For the MLE estimate, $$g'(A) = -\frac{AN_T}{\sigma^2},$$

which is given in equation (9), and $$\hat{A}_k = |f(\hat{A}_{k-1}, \hat{\varphi}_{k-1})|.$$

And for the MAP estimate, $$g'(A) = -A\left(\frac{N_T}{\sigma^2} + \frac{1}{\sigma_A^2}\right) + \frac{1}{A},$$

which is also given in equation (9), and $$\hat{A}_k = |f(\hat{A}_{k-1}, \hat{\varphi}_{k-1})| \frac{1 + \sqrt{1 + \frac{4\sigma^2}{N_T}\left(1 + \frac{\sigma^2}{N_T\sigma_A^2}\right)|f(\hat{A}_{k-1}, \hat{\varphi}_{k-1})|^{-2}}}{2\left(1 + \frac{\sigma^2}{N_T\sigma_A^2}\right)}.$$

As a result, equation (15) becomes:

$$\hat{\varphi}_k = \angle f(\hat{A}_{k-1}, \hat{\varphi}_{k-1})$$

$$\hat{A}_k = \lambda|f(\hat{A}_{k-1}, \hat{\varphi}_{k-1})|, \quad \text{Eq (16)}$$

where $$\lambda = \quad \text{Eq (17)}$$

$$\begin{cases} 1 & \text{MLE solution} \\ \dfrac{1 + \sqrt{1 + \frac{4\sigma^2}{N_T}\left(1 + \frac{\sigma^2}{N_T\sigma_A^2}\right)|f(\hat{A}_{k-1}, \hat{\varphi}_{k-1})|^{-2}}}{2\left(1 + \frac{\sigma^2}{N_T\sigma_A^2}\right)} & \text{MAP solution} \end{cases}$$

From equation (17), it can be seen that the MAP solution approaches the MLE solution as σ²→0 and λ→1. In general, the MLE solution is a special case of the MAP solution.

For clarity, an implementation for the MLE solution is provided below. The MAP solution is more complex, as shown in equation (17), but may also be implemented. For the MLE solution, λ=1 and equation (16) may be simplified as follows:

$$\hat{\varphi}_k = \angle f(\hat{A}_{k-1}, \hat{\varphi}_{k-1})$$

$$\hat{A}_k = |f(\hat{A}_{k-1}, \hat{\varphi}_{k-1})|,$$

which implies that $\hat{A}_k e^{j\hat{\varphi}_k} = f(\hat{A}_{k-1}, \hat{\varphi}_{k-1})$. Equation (10) may then be rewritten as:

$$f(\hat{A}_k, \hat{\varphi}_k) = \frac{1}{N_T}\left[\sum_{i=1}^{N_P} y_i + \sum_{i=N_P+1}^{N_T} y_i \tanh\left(\text{Re}\left\{\frac{\hat{A}_k e^{j\hat{\varphi}_k}}{\sigma^2} y_i^*\right\}\right)\right],$$

which implies that:

$$f(\hat{A}_k, \hat{\varphi}_k) = \frac{1}{N_T}\left[\sum_{i=1}^{N_P} y_i + \sum_{i=N_P+1}^{N_T} y_i \tanh\left(\frac{1}{\sigma^2}\text{Re}\{f(\hat{A}_{k-1}, \hat{\varphi}_{k-1})y_i^*\}\right)\right],$$

or more succinctly:

$$f_k = \frac{1}{N_T}\left[\sum_{i=1}^{N_P} y_i + \sum_{i=N_P+1}^{N_T} y_i \tanh\left(\frac{1}{\sigma^2}\text{Re}\{f_{k-1}y_i^*\}\right)\right]. \quad \text{Eq (18)}$$

As shown in equation (18), the pilot filter output $f_k$ may be solved in an iterative manner to obtain the magnitude and phase estimates, $\hat{A}_k$ and $\hat{\varphi}_k$. Equation (18) may also be decomposed into two summations, with the left summation being performed over the pilot symbols and the right summation being performed over the non-pilot symbols.

A generalized filter structure may be designed to perform the summations for equation (18). In particular, equation (18) may be implemented with a finite impulse response (FIR) filter, an infinite impulse response (IIR) filter, or some other filter structure.

For a FIR pilot filter implementation, equation (18) may be expressed as follows:

$$f_k = \frac{1}{N_T}\sum_{i=1}^{N_T} w_i^{(k)} \cdot y_i, \quad \text{Eq (19)}$$

where $$w_i^{(k)} = \begin{cases} 1 & \text{for } y_i \text{ corresponding to pilot symbols} \\ \tanh\left(\frac{1}{\sigma^2}\text{Re}\{f_{k-1}y_i^*\}\right) & \text{for } y_i \text{ corresponding to non-pilot symbols} \end{cases} \quad \text{Eq (20)}$$

The index k in equations (19) may be modified from a representation of a pure iteration index to a hybrid iteration/time-instant index. The pilot filter output at time instant k (for a causal FIR filter) can then be expressed as:

$$f_k = \frac{1}{N_T}\sum_{i=0}^{N_T-1} w_{k-i}^{(k)} \cdot y_{k-i}, \quad \text{Eq (21)}$$

where $w_i^{(k)}$ is given in equation (20). Equation (21) may be implemented in various manners, some of which are described below.

Figure 4A:
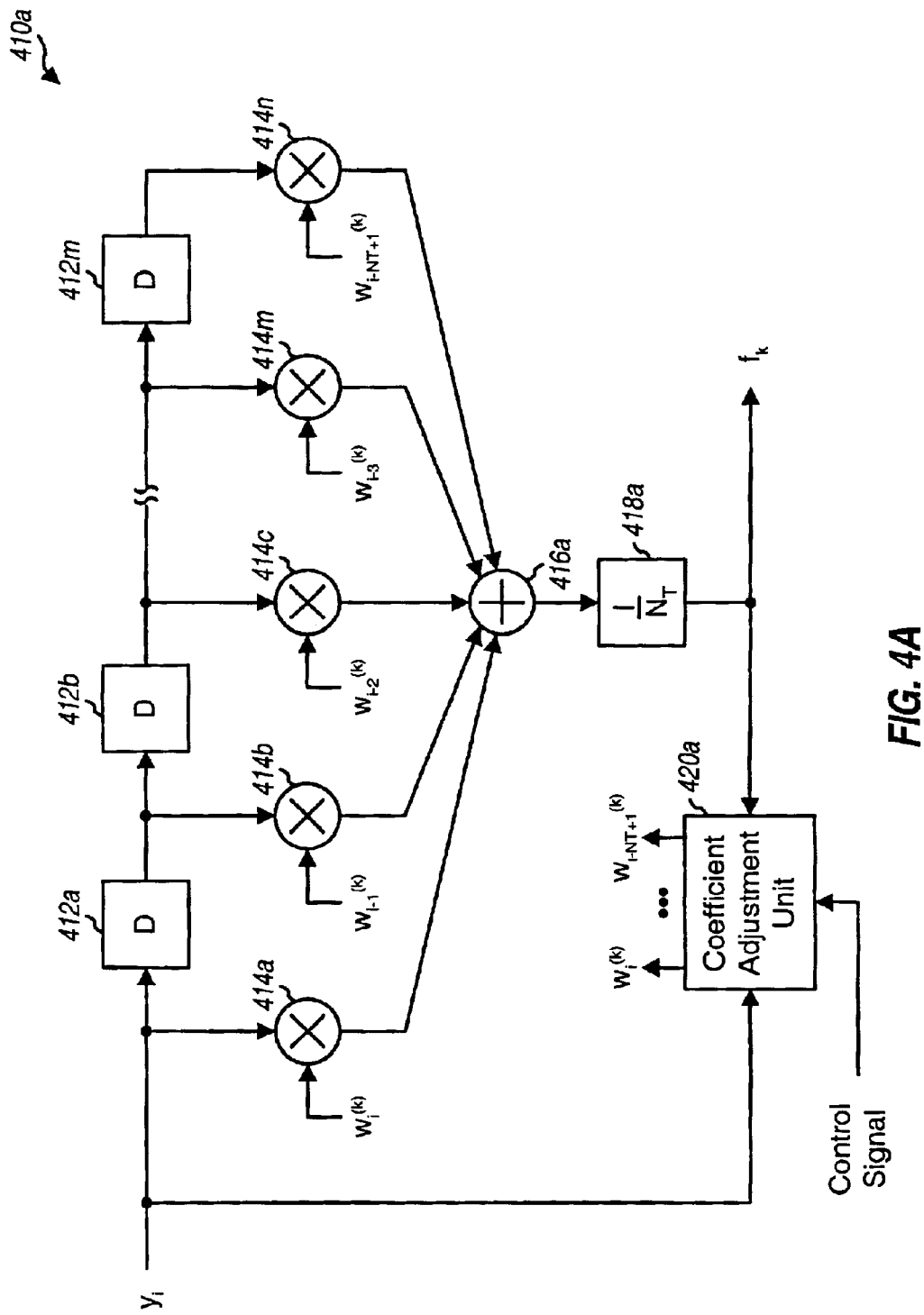
FIGS. 4A through 4C are diagrams of three embodiments of a pilot filter capable of providing an improved estimate of the channel characteristics based on pilot and non-pilot symbols.

FIG. 4A is a diagram of an embodiment of a FIR pilot filter 410a, which may be used to provide an improved estimate of the channel characteristics based on samples corresponding to pilot and non-pilot symbols. The samples $y_i$ corresponding to pilot and non-pilot symbols are provided to a number of ($N_T$–1) delay elements 412a through 412m coupled in series. Each delay element 412 provides one sample of delay. At each time instant k, the sample $y_i$ and the outputs of delay elements 412a through 412m are provided to multipliers 414a through 414n, respectively. Each multiplier 414 also receives a corresponding coefficient $w_i^{(k)}$, multiplies (i.e., weighs) the received sample with the coefficient, and provides a weighted sample to a summer 416a. Summer 416a sums the $N_T$ weighted samples from multipliers 414a through 414n and provides a weighted sum. A divider 418a then receives and scales the weighted sum by a factor of $N_T$, which represents the length of FIR filter 410a, to provide the pilot filter output $f_k$ at time instant k.

Depending on the specific implementation, FIR pilot filter 410a can provide a pilot filter output value for each input sample or for each group of $N_T$ samples (e.g., once each slot). To provide one pilot filter output value for each group of $N_T$ samples, $N_T$ samples are initially loaded into delay elements 412a through 412m. Once all $N_T$ samples have been loaded, the samples are weighted by the coefficients, summed together, and scaled by $N_T$. The coefficients for multipliers 412a through 412m are updated but do not change their position. For example, the coefficient for multiplier 414a may correspond to a non-pilot symbol whereas the coefficient for multiplier 414n may correspond to a pilot symbol.

To provide one pilot filter output value for each sample $y_i$, the samples are again loaded into delay elements 412a through 412m. For each new input sample, the $N_T$ samples are weighted by the coefficients, summed together, and scaled by $N_T$. The coefficients for multipliers 414a through 414m are updated (once for each group of $N_T$ samples) and further shifted to the right to track their corresponding samples. For example, at time instant k, the sample $y_i$ is weighted by coefficient $w_i^{(k)}$ by multiplier 414a. And at the next time instant k+1, this same sample is provided from delay element 412a and weighted by the same coefficient by multiplier 414b.

A coefficient adjustment unit 420a receives the samples $y_i$ and the pilot filter output $f_k$, and updates the coefficients for FIR filter 410a based on the received samples and pilot filter output and in accordance with equation (20). In particular, for the i-th coefficient $w_i^{(k)}$, the pilot filter output $f_{k-1}$ for the previous time instance k–1 is multiplied with the complex conjugate of the sample, $y_i^*$. The real part of the resultant product is then scaled (i.e., divided) by $\sigma^2$. The tanh of the real part is then determined, and the resultant output comprises the i-th coefficient $w_i^{(k)}$.

Figure 4B:
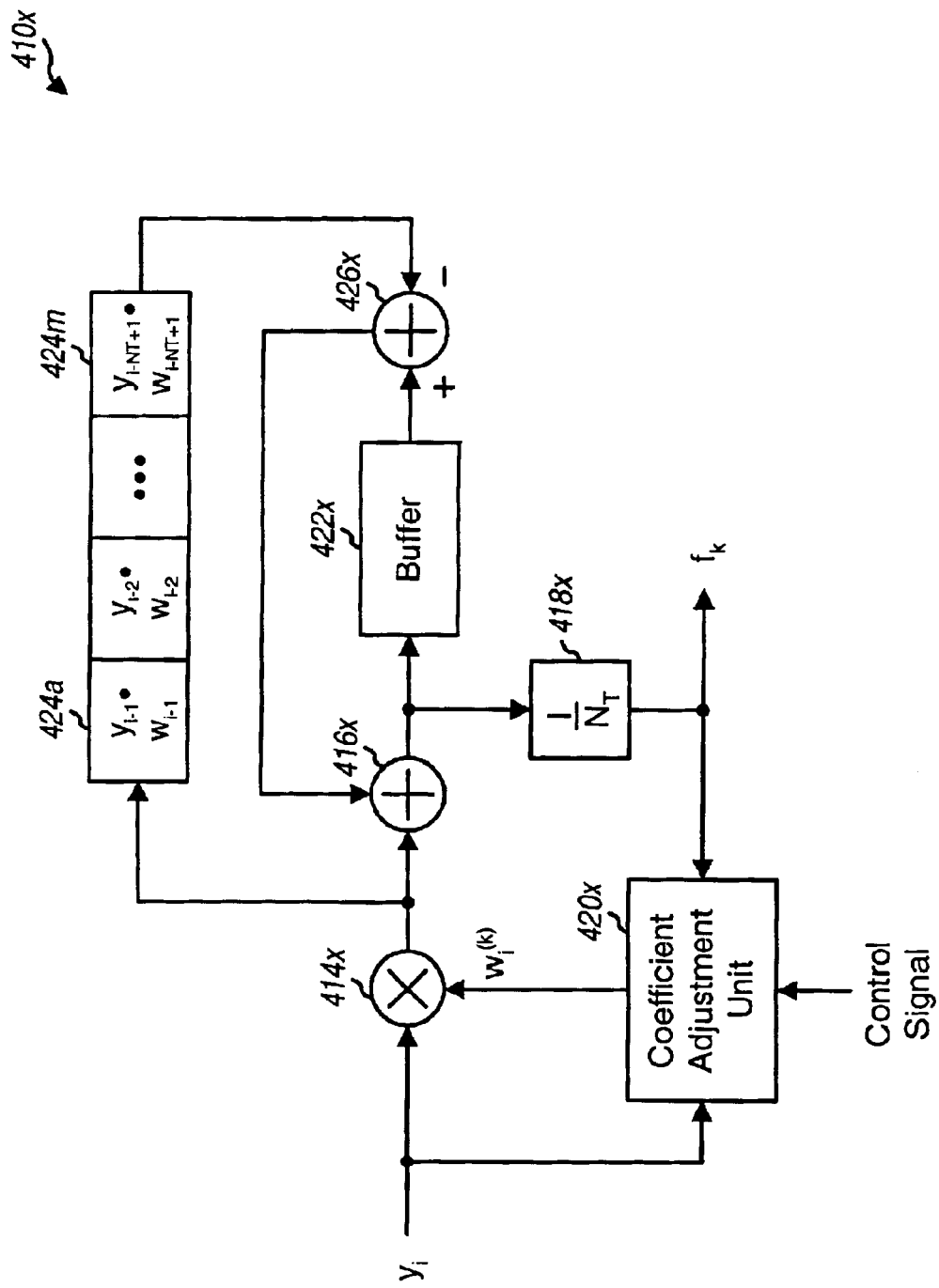

FIG. 4B is a diagram of another embodiment of a FIR pilot filter 410x, which may also be used to provide an improved estimate of the channel characteristics based on samples corresponding to pilot and non-pilot symbols. The samples $y_i$ are provided, one sample at a time, to a multiplier 414x. For each sample period, multiplexer 414x also receives a corresponding coefficient $w_i^{(k)}$ from a coefficient adjustment unit 420x. Multiplier 414x weighs the received sample with the coefficient and provides the weighted sample to a summer 416x and a storage element 424a. Summer 416x also receives an output from a summer 426x, sums the weighted sample from multiplier 414x with the output from summer 426x, and provides an accumulated total to a buffer 422x. Buffer 422x maintains the accumulated total, which represents the sum of $N_T$ weighted samples. At each time instant k, a divider 418x receives and scales the accumulated total by a factor of $N_T$, which represents the number of samples accumulated, to provide the pilot filter output $f_k$. For each input sample, summer 426x receives the oldest weighted sample, $y_{i-N_T+1} \cdot w_{i-N_T+1}^{(k)}$, from storage element 424m and subtracts this weighted sample from the stored accumulated total from buffer 422x to provide an accumulated total for the most recent ($N_T$–1) weighted samples. FIR pilot filter 410x can provide one pilot filter output value for each input sample.

A coefficient adjustment unit 420x operates in similar manner as unit 420a in FIG. 4A. Coefficient adjustment unit 420x receives the samples $y_i$ and the pilot filter output $f_k$, and updates the coefficients for FIR filter 410x based on the received samples and pilot filter output and in accordance with equation (20). A control signal may be provided to ensure that the proper coefficient is updated for each received sample and that the proper coefficient is also provided to multiplier 414x for the received sample.

FIR pilot filter 410x in FIG. 4B requires only one multiplier to implement, and may be preferred over the filter implementation shown in FIG. 4A. As each sample $y_i$ is received, it is weighted either with 1.0 (if it corresponds to a pilot symbol) or with $\tanh(\text{Re}\{f_{k-1}y_i^*/\sigma^2\})$ (if it corresponds to a non-pilot symbol, where $f_{k-1}$ represents the previous pilot filter output). The weighted sample is then accumulated to generate the new pilot filter output value.

For an IIR pilot filter implementation, equation (18) may be expressed as follows:

$$f_k = (1-\alpha)f_{k-1} + \alpha \cdot w_i^{(k)} \cdot y_i, \qquad \text{Eq (22)}$$

where $w_i^{(k)}$ is given in equation (20), and the indices i and k correspond to the same time instance for the IIR implementation. The factor $\alpha$ determines the time constant for the IIR filter. A small value for $\alpha$ (i.e., close to zero) weighs the sample $y_i$ by a smaller factor and results in a longer time constant for the IIR filter. Conversely, a large value for $\alpha$ (i.e., close to one) weighs the sample $y_i$ by a larger factor and results in a shorter time constant for the IIR filter.

Figure 4C:
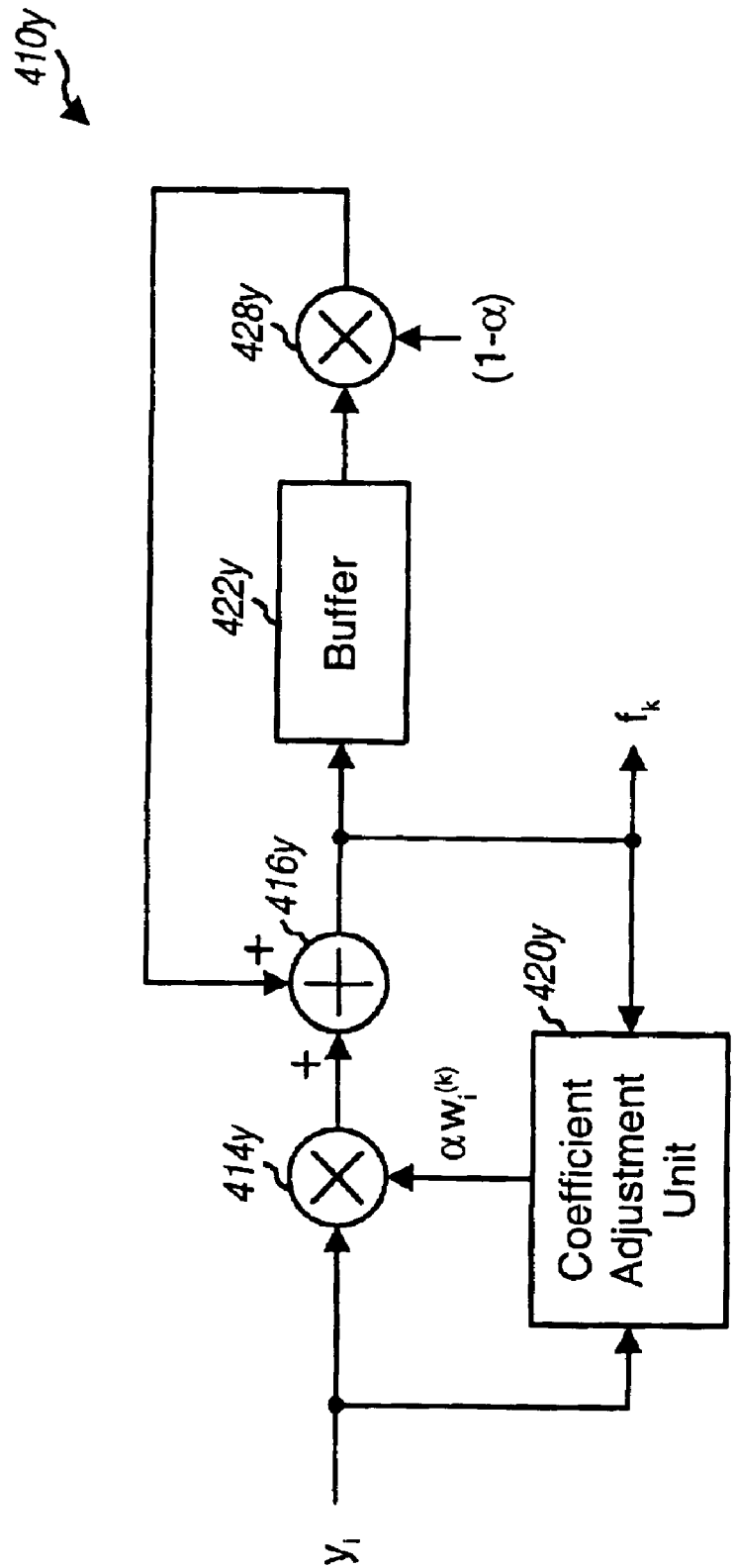

FIG. 4C is a diagram of an embodiment of an IIR pilot filter 410y, which may also be used to provide an improved estimate of the channel characteristics based on samples corresponding to pilot and non-pilot symbols. The samples $y_i$ are provided, one sample at a time, to a multiplier 414y. For each input sample, multiplexer 414y also receives a corresponding scaled coefficient, $\alpha \cdot w_i^{(k)}$, from a coefficient adjustment unit 420y. Multiplier 414y then weighs the received sample with the coefficient and provides the weighted sample to a summer 416y. Summer 416y also receives the output from a multiplier 428y, sums outputs from the two multipliers, and provides the pilot filter output $f_k$. A buffer 422y receives and stores the pilot filter output $f_k$. Buffer 422y further provides one sample of delay and provides the delayed pilot filter output $f_{k-1}$ to multiplier 428y. Multiplier 428y scales the delayed output $f_{k-1}$ with a scaling factor of $(1-\alpha)$. IIR pilot filter 410y can provide a pilot filter output value for each input sample.

A coefficient adjustment unit 420y operates in similar manner as unit 420x in FIG. 4B. Coefficient adjustment unit 420y receives the samples and the pilot filter output, and updates the coefficients for IIR filter 410y based on the received input samples and pilot filter output and in accordance with equation (20).

FIGS. 4A through 4C show three different designs of a pilot filter that can provide improved channel estimates. Other designs for a pilot filter that incorporates non-pilot symbols can also be contemplated and are within the scope of the invention.

As shown in equation (20), the filter coefficient $w_i^{(k)}$ includes a term for the variance of the noise $\sigma^2$. The value of $\sigma^2$ may be estimated in numerous ways, some of which are described below.

For a typical receiver implementation, an automatic gain control (AGC) circuit is used to set the amplitude of the input signal into the analog-to-digital converter (ADC) such that the digitized samples, $I_{ADC}$ and $Q_{ADC}$, have a variance set at a particular value (e.g., $I_o$). Specifically, the ADC input signal may be such that $E[I_{ADC}^2 + Q_{ADC}^2] = I_o$, where $E[x]$ denotes the expected (or mean) value of x, and $I_o$ may be selected, for example, as 18 for 4-bit ADC samples.

The received energy $I_o$ is composed of the received symbol energy per chip $E_c$ and the total noise energy $N_t$. (i.e., $I_o = E_c + N_t$). If the processing gain of the non-pilot symbol is $N_c$ and the gain on a received symbol is g, then the noise variance $\sigma^2$ may be expressed as:

$$\sigma^2 = \frac{N_c \cdot N_t \cdot g^2}{2}, \qquad \text{Eq (23)}$$

where the division by 2 in equation (23) arises from the projection of $f_{k-1} \cdot y_i^*$ to obtain the real part. So, if the receiver employs an estimator for $N_t$ (such as any of type of estimator for $N_t$ known in the art), then the value of $\sigma^2$ can be determined using equation (23). Alternatively, $\sigma^2$ may be approximated with a constant. That is, the received symbol energy $E_c$ is typically a small fraction of $I_o$, in which case $I_o \cong N_t$ and equation (23) may be approximated as:

$$\sigma^2 \cong \frac{N_c \cdot I_o \cdot g^2}{2}. \qquad \text{Eq (24)}$$

Other implementations different from that shown in equation (24) may also be used. In general, the noise variance may be determined as:

$$\sigma^2 = h \cdot I_o, \qquad \text{Eq (25)}$$

where h is a particular positive value.

To simplify the evaluation of the argument to the tanh function in equation (20), $1/\sigma^2$ may be implemented as:

$$\frac{1}{\sigma^2} \cong \frac{k}{2^n}, \qquad \text{Eq (26)}$$

where k and n are selected to achieve the desired level of accuracy. Using the approximation in equation (26), the evaluation of the argument to the tanh function, $(1/\sigma^2) \cdot \text{Re}\{f_{k-1} \cdot y_i^*\}$, is then simply a particular number of left and right shifts of the term $\text{Re}\{f_{k-1} \cdot y_i^*\}$.

Various simplifications may be made to reduce the complexity of the pilot filter. In an embodiment, a limited number of filter coefficients may be used. For example, a first coefficient (with a value of 1.0) may be used for pilot symbols and a second coefficient (computed as shown in equation (20)) may be used for non-pilot symbols. The second coefficient may be updated in various manners such as (1) once for each sample corresponding to a non-pilot symbol, (2) once for a group of samples corresponding to non-pilot symbols, or (3) once for each group of $(N_T - N_P)$ samples corresponding to non-pilot symbols.

If a limited number of coefficients are used, then other simplifications may also be performed for the pilot filter. For example, a number of samples $y_i$ may be accumulated prior to multiplication with the coefficients. This reduces the required number of multipliers and/or multiplications.

Figure 6:
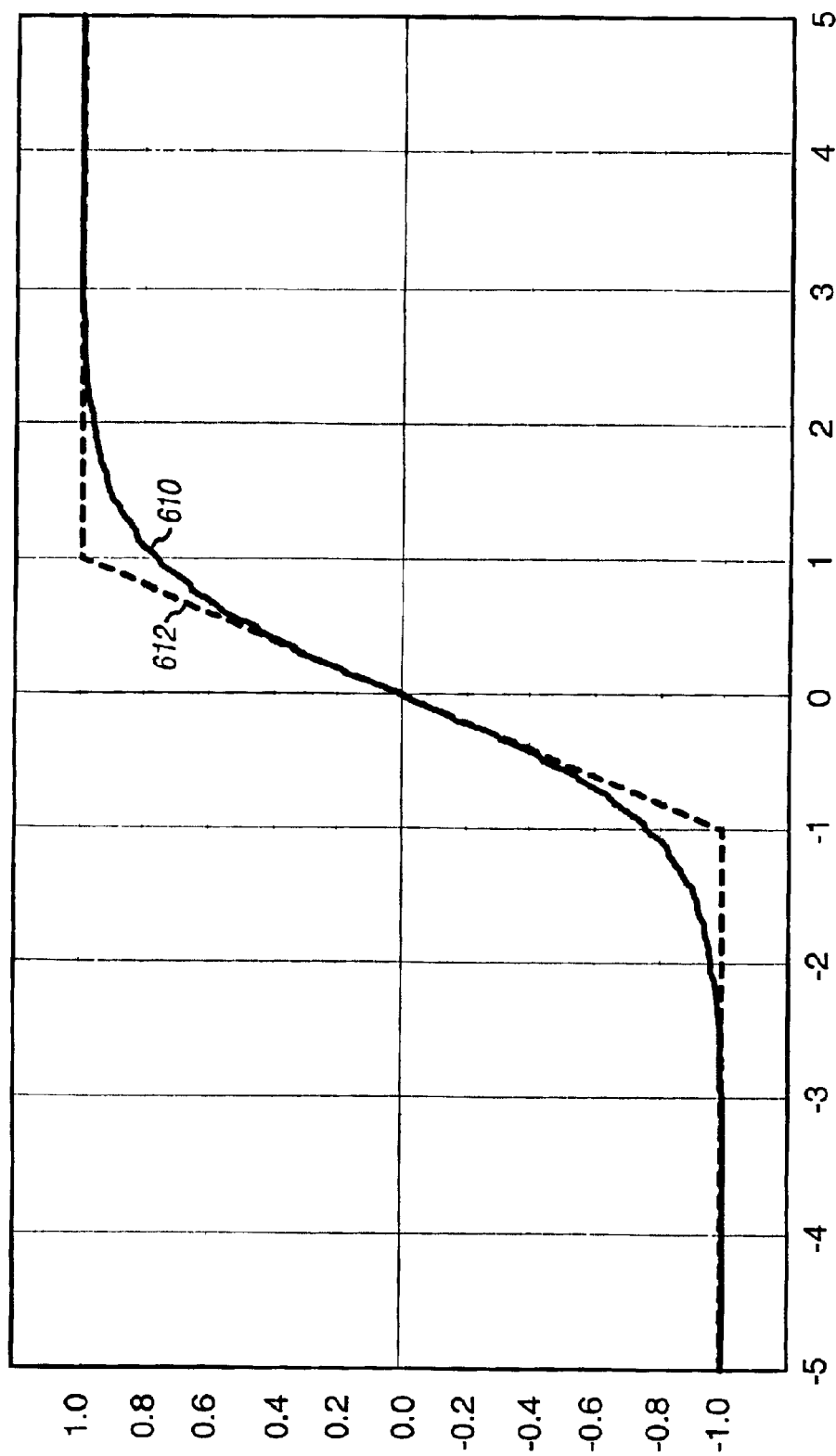
FIG. 6 shows plots of a tanh function and a piece-wise approximation of the tanh function, which may be used to derive the coefficients for the pilot filter.

FIG. 6 is a plot of the tanh function used in equation (20) to derive the coefficients $w_i^{(k)}$ for the pilot filter. The tanh function may be implemented in various manners, such as with a look-up table. To reduce the complexity of the pilot filter, the tanh function (plot 610) may be approximated with a piece-wise linear function (plot 612).

To further simplify the implementation of the pilot filter, the coefficients for the pilot filter may be quantized to L bits, where L can be an integer selected to reduce the complexity of the multipliers/multiplications. For example, L may be selected as five, and the coefficients may be quantized to nine possible values of ±{0, ¼, ½, ¾, and 1 }. The quantization of the coefficients can greatly simplify the multiplier/multiplication in the pilot filter. Simulations have shown that the approximation of the tanh function with a piece-wise linear function and the quantization of the coefficients to nine possible values degrade the performance of the pilot filter by a negligible amount, if any.

The pilot filter described herein may be viewed as a filter capable of weighing the samples $y_i$ by different sets of coefficients, which have values determined by, and corresponding to, the confidence in the detected value. The samples corresponding to pilot symbols are typically associated with higher degree of confidence and are weighted more (e.g., with weights of 1.0). The samples corresponding to non-pilot symbols are typically associated with lower confidence and are weighted with values that may be variable and dependent on the degree of confidence in the samples (e.g., with weights ranging from 0.0 up to 1.0, or $0 \leq w_i^{(k)} \leq 1.0$).

The use of non-pilot symbols along with pilot symbols in the pilot filter can improve the estimate of the channel amplitude and phase. In fact, for some operating conditions applicable to a W-CDMA system, an improvement of up to 1.0 dB in the SNR for the pilot filter output may be achieved by incorporating non-pilot symbols in the pilot filter. The higher pilot SNR can provide improved system performance, which may be quantified in terms of improved coded bit error rate (BER) or frame error rate (FER).

Figure 5:
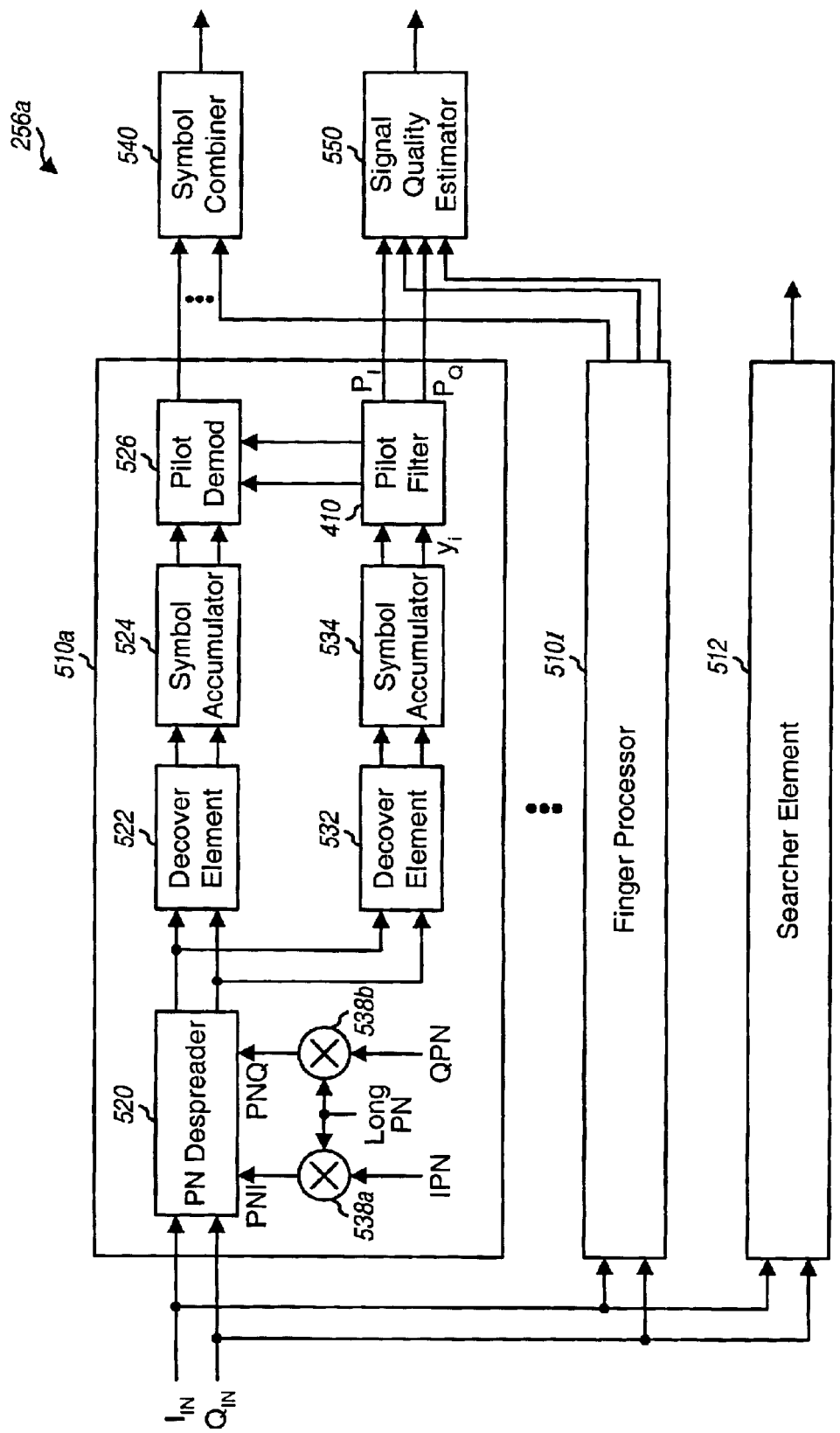
FIG. 5 is a block diagram of an embodiment of a rake receiver capable of implementing various aspects of the invention.

FIG. 5 is a block diagram of an embodiment of a rake receiver 256 i a, which is a specific design for demodulator 256 in FIG. 2. Rake receiver 256a is also capable of implementing various aspects of the invention. Due to multipath and other phenomena, a transmitted signal may reach the base station via multiple signal paths. For improved performance, rake receiver 256a is designed with the capability to process multiple (and typically strongest) instances of the received signal (or multipaths). Rake receiver 256a includes a number of finger processors 510, with each finger processor 510 comprising a finger of the rake receiver and can be assigned to process a particular multipath.

As shown in FIG. 5, the complex samples, $I_{IN}$ and $Q_{IN}$, from receiver 254 are provided to a number of finger processors 510a through 510l. Within each assigned finger processor 510, the $I_{IN}$ and $Q_{IN}$ samples are provided to a PN despreader 520, which also receives a complex PN sequence, PNI and PNQ. The complex PN sequence is generated in accordance with the particular design of the CDMA system being implemented and, for some CDMA systems, is generated by multiplying the short IPN and QPN sequences with the long PN sequence by multipliers 538a and 538b. The short IPN and QPN sequences are used to spread the data at the transmitting remote terminal, and the long PN sequence is assigned to the remote terminal and may be used to scramble the data. The PNI and PNQ sequences are generated with a time offset corresponding to that of the multipath being processed by that finger processor.

PN despreader 520 performs a complex multiply of the complex $I_{IN}$ and $Q_{IN}$ samples with the complex PN sequence and provides complex despread $I_{DES}$ and $Q_{DES}$ samples to decover elements 522 and 532. Decover element 522 decovers the despread samples with one or more channelization codes (e.g., Walsh codes) that were used to cover the data and generates complex decovered samples. The decovered samples are then provided to a symbol accumulator 524 that accumulates the samples over the length of the channelization code to generate decovered symbols. The decovered symbols are then provided to a pilot demodulator 526.

For some CDMA systems, a pilot reference is transmitted during a portion of the uplink transmission (e.g., as shown in FIG. 3). Thus, decover element 532 decovers the despread samples with the particular channelization code (e.g., a Walsh code 0 for some CDMA systems, or an OVSF code of 0 for a W-CDMA system) that was used to cover the pilot at the remote terminal. The decovered pilot samples are then provided to an accumulator 534 and accumulated over a particular time interval to generate samples $y_i$, for i=1, . . . , $N_P$, corresponding to pilot symbols. The accumulation time interval can be the duration of the pilot channelization code, an entire pilot reference period, or some other time interval. The samples $y_i$ corresponding to pilot symbols are then provided to a pilot filter 410.

Similarly, during non-pilot symbol periods, decover element 532 decovers the despread samples with the particular channelization code used to cover the non-pilot symbols at the remote terminal. The decovered non-pilot samples may be accumulated over a particular time interval by accumulator 534 to generate samples $y_i$, for i=$N_P$1+, . . . , $N_T$, corresponding to non-pilot symbols. The accumulation time interval used for samples corresponding to non-pilot symbols may be the same or different from that used for samples corresponding to pilot symbols. The samples $y_i$ corresponding to non-pilot symbols are also provided to pilot filter 410.

Pilot filter 410 may be implemented with any one of the pilot filter designs described above in FIGS. 4A through 4C or some other design. Pilot filter 410 generates pilot estimates based on the samples $y_i$ corresponding to pilot and non-pilot symbols and provides the pilot estimates to pilot demodulator 526. Although not shown in FIG. 5, pilot filter 410 may further receive and utilizes the samples for other data symbols (e.g., from symbol accumulator 524) to generate the pilot estimates. Pilot filter 410 typically provides a pilot estimate for each data sample to be demodulated. Depending on the specific implementation, pilot filter 410 may perform interpolation on the FIR or IIR filter output $f_k$ to generate the required pilot estimates.

Pilot demodulator 526 performs coherent demodulation of the decovered symbols from symbol accumulator 524 with the pilot estimates from pilot filter 536 and provides demodulated symbols to a symbol combiner 540. Coherent demodulation can be achieved by performing a dot product and a cross product of the decovered symbols with the pilot estimates. The dot and cross products effectively perform a phase demodulation of the data and further scale the resultant output by the relative strength of the recovered pilot. The scaling with the pilots effectively weighs the contributions from different multipaths in accordance with the quality of the multipaths for efficient combining. The dot and cross products thus perform the dual role of phase projection and signal weighting that are characteristics of a coherent rake receiver.

Symbol combiner 540 receives and coherently combines the demodulated symbols from all assigned finger processors 510 to provide recovered symbols for a particular received signal being processed by the rake receiver. The recovered symbols for all received signals may then be combined to generate overall recovered symbols that are then provided to the subsequent processing element.

Searcher element 512 can be designed to search for strong multipaths of the received signal at numerous time offsets, and the multipaths having the highest signal quality measurements are selected. The available finger processors 510 are then assigned to process these multipaths.

For simplicity, various aspects and embodiments of the pilot filter have been described for a specific implementation in a base station of a CDMA system. The pilot filter may also be implemented and used in the remote terminal of the CDMA system. In general, the pilot filter described herein may be advantageously used in any wireless communication system in which a pilot is transmitted in a non-continuous manner and other information is available for use.

The pilot filter may be implemented in hardware, software, firmware, or a combination thereof. For a hardware design, the pilot filter may be implemented within a digital signal processor (DSP), an application specific integrated circuit (ASIC), a processor, a microprocessor, a controller, a microcontroller, a field programmable gate array (FPGA), a programmable logic device, other electronic unit, or any combination thereof. And for a software or firmware design, the pilot filter may be implemented with codes executed by a processor (e.g., controller 230 or 270 in FIG. 2).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for generating pilot estimates indicative of characteristics of a communication link, comprising:

receiving samples corresponding to pilot symbols and non-pilot symbols;

weighting samples corresponding to pilot symbols in accordance with a first set of one or more coefficients to provide first weighted samples;

weighting samples corresponding to non-pilot symbols in accordance with a second set of one or more coefficients to provide second weighted samples; and generating the pilot estimates based on the first and second weighted samples.

2. The method of claim 1, further comprising:

updating the one or more coefficients in the second set based on the samples corresponding to non-pilot symbols.

3. The method of claim 2, wherein the one or more coefficients in the second set are updated further based on the pilot estimates.

4. The method of claim 3, wherein the one or more coefficients in the second set are updated further based an a value indicative of the quality of the samples used to update the coefficients.

5. The method of claim 3, wherein the one or more coefficients in the second set are updated further based on a value indicative of a signal-to-noise-plus-interference ratio (SNR) of the samples used to update the coefficients.

6. The method of claim 4, wherein the coefficients in the second set are updated to larger values if the quality of the samples is high, and to lower values it the quality of the samples is low.

7. The method of claim 1, wherein the one or more coefficients in the second set are updated as:

$$\tanh\left(\frac{1}{\sigma^2}\mathrm{Re}\{f_{k-1}y_i^*\}\right),$$

where $f_{k-1}$ is the pilot estimate for a prior time instance k−1, $y_i$ are samples corresponding to non-pilot symbols, and $1/\sigma^2$ is representative of the quality of the samples used to update the coefficients.

8. The method of claim 7, wherein the tanh function is approximated with a piece-wise linear function.

9. The method of claim 7, wherein the term $1/\sigma^2$ is approximated with a constant.

10. The method of claim 1, wherein the coefficients in the first and second set are quantized to L bits, where L is 5 or less.

11. The method of claim 1, wherein the coefficients in the second set have magnitude equal to or less than the magnitude of the coefficients in the first set.

12. The method of claim 1, wherein the coefficients in the first set have equal magnitude.

13. The method of claim 1, wherein the pilot and non-pilot symbols are time-division multiplexed in a CDMA data transmission.

14. The method of claim 13, wherein the CDMA data transmission conforms to W-CDMA standard.

15. A pilot filter in a wireless communication system, comprising:

one or more multipliers configured to receive and weigh samples corresponding to pilot symbols with one or more first coefficients to provide first weighted samples, and to receive and weigh samples corresponding to non-pilot symbols with one or more second coefficients to provide second weighted samples; and a summer coupled to the one or more multipliers and configured to receive and combined the first and second weighted samples to provide pilot estimates.

16. The pilot filter of claim 15, further comprising:

a coefficient adjustment unit configured to receive the samples corresponding to the non-pilot symbols and the pilot estimates, and to update the one or more second coefficients based on the received samples and pilot estimates.

17. The pilot filter of claim 16, wherein the coefficient adjustment unit is further configured to update the one or more second coefficients based on the quality of the samples used to update the coefficients.

18. The pilot filter of claim 15, and implemented with a finite impulse response (FIR) filter structure.

19. The pilot filter of claim 15, and implemented with an infinite impulse response (IIR) filter structure.

20. The pilot filter of claim 15, wherein the first and second coefficients are quantized to L bits, where L is 5 or less.

21. The pilot filter of claim 15, wherein the samples corresponding to pilot and non-pilot symbols are derived from a CDMA data transmission.

22. A rake receiver in a wireless communication system, comprising:

a plurality of finger processors, each finger processor configurable to process a respective instance of a received signal, each finger processor further including a despreader configured to receive and despread digitized samples in accordance with one or more pseudo-noise (PN) sequences to provide despread samples, a first processor coupled to the despreader and configured to receive and process the despread samples to provide first samples, a second processor coupled to the despreader and configured to receive and process the despread samples to provide second samples, a pilot filter coupled to the second processor and configured to receive and filter the second samples to provide pilot estimates, wherein the pilot fiber is further configured to weigh samples corresponding to pilot symbols with a first act of one or more weights and to weigh samples corresponding to non-pilot symbols with a second set of one or more weights, and a pilot demodulator coupled to the first processor and the pilot filter and configured to receive and demodulate the first samples with the pilot estimates to provide recovered symbols.

* * * * *